United States Patent [19] [11] 4,217,428
McConnell et al. [45] * Aug. 12, 1980

[54] BLENDS OF SUBSTANTIALLY AMORPHOUS HIGHER 1-OLEFIN COPOLYMERS AND TACKIFYING RESINS USEFUL AS PRESSURE-SENSITIVE ADHESIVES

[75] Inventors: Richard L. McConnell, Kingsport; Doyle A. Weemes, Greeneville; Frederick B. Joyner, Kingsport, all of Tenn.

[73] Assignee: Eastman Kodak Company, Rochester, N.Y.

[*] Notice: The portion of the term of this patent subsequent to May 4, 1993, has been disclaimed.

[21] Appl. No.: 849,373

[22] Filed: Nov. 7, 1977

Related U.S. Application Data

[63] Continuation-in-part of Ser. No. 654,317, Feb. 2, 1976, Pat. No. 4,072,812, which is a continuation-in-part of Ser. No. 563,534, Mar. 31, 1975, Pat. No. 3,954,697.

[51] Int. Cl.² .................... C08L 23/18; C08L 23/20; C09J 3/14
[52] U.S. Cl. .................... 525/191; 428/355; 525/210; 525/211; 525/216; 525/232; 525/240; 526/348.2
[58] Field of Search ...................... 260/897 A, 897 R; 525/191, 216, 240, 210, 211, 232

[56] References Cited

U.S. PATENT DOCUMENTS

| 3,701,760 | 10/1972 | Hagemeyer, Jr. et al. | 526/19 |
| 3,923,758 | 12/1975 | Carter, Jr. et al. | 526/348.6 |
| 3,954,697 | 5/1976 | McConnell et al. | 526/348.3 |
| 4,022,728 | 5/1977 | Trotter et al. | 260/897 A |
| 4,072,735 | 2/1978 | Ardemagni | 260/897 A |
| 4,072,813 | 2/1978 | McConnell et al. | 526/348.7 |

OTHER PUBLICATIONS

Kirk–Othmer, vol. 1, p. 382.

*Primary Examiner*—Stanford M. Levin
*Attorney, Agent, or Firm*—Clyde L. Tootle; Daniel B. Reece, III

[57] ABSTRACT

This invention relates to blends of substantially amorphous propylene/higher 1-olefin, 1-butene/higher 1-olefin, or propylene/1-butene/higher 1-olefin copolymers with tackifying resins which provide permanently tacky, low viscosity materials which have useful pressure-sensitive adhesive properties. The copolymers contain 40 to 60 mole % of one or more higher 1-olefins of the group 1-hexene, 1-heptene, 1-octene, 1-nonene and 1-decene and have a melt viscosity range of 10,000 to 75,000 cp. at 190° C.

10 Claims, No Drawings

BLENDS OF SUBSTANTIALLY AMORPHOUS HIGHER 1-OLEFIN COPOLYMERS AND TACKIFYING RESINS USEFUL AS PRESSURE-SENSITIVE ADHESIVES

This is a continuation-in-part application of Ser. No. 654,317, filed Feb. 2, 1976, now U.S. Pat. No. 4,072,812 which is a continuation-in-part application of Ser. No. 563,534, filed Mar. 31, 1975, now U.S. Pat. No. 3,954,697.

This invention relates to hot melt pressure sensitive adhesive compositions having a novel combination of properties. More specifically, the invention relates to hot melt pressure sensitive adhesive compositions having a novel combination of properties including good bleed-through resistance, good resistance to plasticizer migration and good heat stability.

Pressure sensitive adhesives that have good tack and adhere to numerous substrates are widely used by industry in various applications such as in consumer products. For example, one such application is in the construction of floor tiles having a preapplied adhesive for the do-it-yourself market. In this application the pressure sensitive adhesive is thinly coated onto the undersurface of floor tiles and covered with a protective release sheet. Installation of the floor tiles is accomplished by removing the release sheet and pressing the tile into place. The pressure sensitive adhesives presently used in this type application generally contain either a styrene-butadiene rubber or a styrene-isoprene rubber. Although these pressure sensitive adhesives provide adequate adhesive properties, they have certain deficiencies that limit their usefulness. These adhesives have poor resistance to plasticizer migration and consequently in applications such as use on floor tiles allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot melt pressure sensitive adhesive that has good adhesive properties without the disadvantages associated with prior pressure sensitive adhesives.

In accordance with the present invention, a blend comprising a substantially amorphous propylene/higher 1-olefin copolymer, a 1-butene/higher 1-olefin copolymer, or a propylene/1-butene/higher 1-olefin copolymer and at least one compatible tackifying resin provides a hot melt pressure sensitive adhesive having a novel combination of properties including good resistance to plasticizer migration and good heat stability. The copolymers used in preparing the blends of this invention can be used alone as pressure sensitive adhesives. However, the blends of this invention containing such copolymers have improved probe tack and lower viscosity to provide improved coatability. These blends also have improved peel strength and higher shear adhesion failure time which is unexpected since reducing the viscosity of the unmodified copolymers generally results in a lower shear adhesion failure time. A high shear adhesion failure time is necessary for carton seals or bonds which must withstand fracture when exposed to load forces for long periods of time.

The propylene/higher 1-olefin copolymers useful in preparing the compositions of this invention are disclosed in applicants' U.S. Pat. No. 3,954,697. Such copolymers contain 40-60 mole % higher 1-olefin and for all practical purposes are essentially amorphous. For example, these useful copolymers show little or no crystallinity by either X-ray or DSC techniques.

It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43, 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of about <0.86 and a Tg intermediate between that observed for polypropylene (or poly-1-butene) and that of the higher poly-1-olefins. For example, polypropylene has a Tg of about −20° C. and poly-1-hexene has a Tg of about −50° C. (J. Brandrup and E. H. Immergut, Editors, "Polymer Handbook", Interscience Publishers, New York City, 1966). Useful propylene/1-hexene copolymers containing 40-60 mole % 1-hexene normally show Tg values of about −30° to −45° C. If the copolymer is too "blocky" (i.e., contains relatively long segments of propylene), the copolymer will have a density of <0.86 and it will show a Tg value greater than about −25° C.

The NMR spectra can also be used to characterize the pressure-sensitive adhesives of this invention. For example, carbon-13 NMR spectra of operable propylene/1-hexene/1-octene copolymers determined in a mixture of o-dichlorobenzene and deuterobenzene as solvent and hexamethyldisiloxane as an internal standard shows a single peak at 12.2 ppm. and a multiplicity of peaks centered at about 19.7, 18.9 and 18.1 ppm. The single peak at about 12.2 ppm. is due to the presence of the methyl group in the side groups of the 1-hexene and 1-octene monomer units. The three sets of multiplets are due to the methyl side groups of the propylene monomer units. There are three sets of multiplets since there are triads of propylene monomer units present in all three possible types of stereoregular configurations (e.g., lll or ddd triads, ddl or lld triads, and ldl or dld triads). These new pressure-sensitive adhesive polymers appear to be multiblock copolymers of higher 1-olefin and propylene (or 1-butene) wherein the propylene (or 1-butene) blocks are partly stereoregular and partly heterotactic segments which are predominantly <20 monomer units long and wherein the higher 1-olefin blocks are incapable of crystallization at least over the use temperature range of −20° to 180° F. We believe these substantially amorphous copolymers contain a very low order of polypropylene-type (or 1-butene type) crystallinity which accounts for their good cohesive strength in pressure-sensitive adhesive applications.

This structural interpretation of these copolymers is in accord with the following measurable parameters:

| | |
|---|---|
| Melt viscosity range, cp. at 190° C. | 10,000–75,000 |

| | |
|---|---|
| Density range, g./cc. | 0.85–0.86 |
| Tg range, °C. (glass transition temperature) | −30 to −45 |
| Tm (crystalline melting point) | No measurable Tm by DSC-1B instrument. A weak endotherm at about 40–45° C. can sometimes be detected with DSC-2 instrument. |

The type of catalyst and the polymerization conditions required to provide such copolymers are quite limited. In general, the best results have been achieved by using catalyst systems which provide poor stereoregulation in the polymerization of propylene or 1-butene. Combinations of Et$_3$Al with AATiCl$_3$ with Al/Ti molar ratios ranging from about 1:1 to 5:1 have been found to be useful. It is also generally desirable to conduct the polymerization at relatively high temperatures such as from about 140° to about 170° C., preferably 150°–160° C., to provide copolymers having adequate pressure-sensitive adhesive properties.

If catalysts which provide highly stereoregular propylene homopolymer are used to copolymerize propylene or 1-butene, with hexene, heptene, octene, nonene, and decene, multiblock copolymers are often formed which contain crystallizable propylene or 1-butene segments. Such copolymers usually have inadequate pressure-sensitive adhesive properties. Examples of highly stereospecific catalysts (for the polymerization of propylene) which provide this result include EtAlCl$_2$/Bu$_3$N/TiCl$_3$, EtAlCl$_2$/HPT/TiCl$_3$, and Et$_2$AlCl/HPT/TiCl$_3$ catalysts (Bu$_3$N=tributylamine; HPT=hexamethylphosphoric triamide).

The preferred melt viscosity range for the unmodified copolymers of this invention include about 20,000 to about 75,000 cp. at 190° C. The operable melt viscosity range is 10,000 to 75,000 cp.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° C. to about 135° C.; an acid number of from about 0–2, a saponification value of less than about 1; and an iodine value of from about 30 to 100. Examples of such commercially available resins of this type are "Wingtack" 95 and "Wingtack" 115 tackifying resins sold by the Goodyear Tire and Rubber Company, the Sta-tac and Betaprene A or H resins sold by the Reichhold Chemical Corporation, Arkon resins sold by Arakawa Forest Chemical Industries, and Escorez resins sold by Exxon Chemical Co.

Also other suitable resins are the terpene polymers such as the polymeric, resinous materials obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez Terpene Resins include Ring and Ball Softening points of about 55° to 125° C. (ASTM E-28-67), Color of 2 to 3 (Gardner 1963, 50% in Heptane), Acid Number of less than 1 (ASTM D465-59), Saponification Number of less than 1 (ASTM D464-59) and Specific Gravity at 25° C. of 0.96 to 0.99 (ASTM D1963-61).

The hydrocarbon resins, polyterpenes, or other compatible tackifying resins can be used either alone or in combination. These tackifying resins can be used in amounts of about 1 percent to about 40 percent by weight of the adhesive composition, preferably about 10 percent to about 35 percent by weight.

The pressure sensitive adhesive compositions of this invention are prepared by blending together the two components in the melt at a temperature of about 160° C. to about 200° C., until a homogeneous blend is obtained. Various methods of blending materials of this type are known to the art and any method that produces a homogeneous blend is satisfactory. These components blend easily in the melt and a heated vessel equipped with a stirrer is all that is required. For example, A Cowles stirrer provides an effective mixing means for preparing these hot melt pressure sensitive adhesive compositions.

In addition to the propylene or 1-butene/higher 1-olefin copolymer and tackifier, it is desirable for the hot melt pressure sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethyl-benzene], "Dalpac" 4C2 [2,6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)]. A particularly effective antioxidant is Irganox 1010 which is identified as pentaerythritol tetrakis[3-(3,5-di-tert-butyl-4-hydroxyphenyl)propionate].

There are numerous uses for the pressure sensitive adhesives of the present invention. One such use is in the construction of women's sanitary napkins. A strip of the pressure sensitive adhesive may be applied to the polyethylene shield of the napkin and then protected by a release sheet. At the time of use, the release sheet is removed and the napkin is held in place by adhering the pressure sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure sensitive adhesive is thinly coated onto the undersurface of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles.

Other major uses for these pressure sensitive adhesives include their use on tapes and labels.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

This example illustrates one process for the synthesis of the propylene/higher 1-olefin copolymer used in the present invention.

In a nitrogen filled dry box, 200 ml. of dry mineral spirits, 268 ml. of 1-hexene (distilled and dried over molecular sieve), and 0.37 g. AATiCl$_3$ are placed into a clean, dry, 1-liter Parr autoclave, equipped with a stirrer. The autoclave is sealed in the dry box. A clean, dry catalyst injector is loaded with 0.36 g. of Et$_3$Al and 35 ml. of dry mineral spirits in the dry box and then it is connected to the autoclave. The molar ratio of Al to Ti in the catalyst is 1.3 to 1.

After removing the autoclave from the dry box, 120 ml. of liquid propylene is pressured into the autoclave. The autoclave is heated to 135° C. with stirring. Then the Et$_3$Al solution is injected into the monomer solution to initiate the copolymerization. The copolymerization is exothermic and the temperature of the reaction mixture increases to 160° C. This temperature is maintained for 4 hours and then 200 ml. of isobutyl alcohol is pumped into the autoclave to deactivate the catalyst. The temperature is maintained at 160° C. for an additional 15 minutes. Then the autoclave is cooled to 23° C., vented, and the copolymer is placed in an excess of isobutyl alcohol. The mixture is heated to 105° C., cooled, filtered and the soft, sticky, colorless copolymer is washed with additional isobutyl alcohol to remove catalyst residues. The copolymer is stabilized with 0.25% Irganox 1010 and dried in a vacuum oven at 70°–80° C. The tacky, amorphous copolymer was obtained in 72% conversion and it has a melt viscosity of 19,530 cp. at 190° C., an I.V. of 0.55 (0.25% in Tetralin at 145° C.) and a Tg of −31° C. It contains 48 mole % 1-hexene. Coated poly(ethylene terephthalate) tape has a peelstrength of 3.6 lb./in. width, probe tack of 715 g./0.5 cm. diameter probe, and shear adhesion failure time of 3,112 minutes.

EXAMPLE 2

About 37.5 grams of the poly(52-propylene-co-48-1-hexene) copolymer of Example 1 [19,530 cp. at 190° C. by ASTM D1238; Tg=−31° C.] and 12.5 grams of Wingtack 95 tackifying resin (a synthetic polyterpene hydrocarbon type tackifying resin based on a C$_5$ olefin fraction; Ring and Ball softening point=100±5° C., iodine number =30, specific gravity =0.93) are physically blended for 30 minutes at 200° C. under a nitrogen blanket in a glass tube using a stainless steel propeller-type stirrer. The blend is stablizied against oxidative degradation by the addition of 0.25 weight % Irganox 1010 antioxidant, pentaerythritol tetrakis[3-(3,5-ditert-butyl-4-hydroxyphenyl)propionate]. The resulting blend is removed from the glass tube and allowed to cool to 23° C. At 23° C. the blend is very tacky to the touch. The melt viscosity of the blend is 7860 cp. at 190° C. when measured with a Tinius Olsen Melt Indexer (ASTM D1238) using an 0.04 in. orifice and 2160 g. weight.

Samples of the blend are placed in a Brookfield Thermosel Viscometer (23,000 cp. at 177° C.) and are maintained at 177° C. for 24 hours in contact with air. The samples do not change in melt viscosity during this period and they do not show any evidence of char formation or film formation on the surface of the melt.

The blend has a glass transition temperature (Tg) of −19° C.

The blend is coated from the melt (190° C.) 0.001±0.0002 inch thick onto Mylar film (0.001 inch thick) using a heated doctor blade. The resulting pressure-sensitive tapes are transparent and have a probe tack value of 1098 g./0.5 cm. diameter probe and a 180° peel adhesion value of 4.3 lb./in.-width after aging tapes 24 hr. at 23° C. and 50% R.H. No adhesive residue is left when the coated tapes are peeled from the stainless steel test panels. The tapes have shear adhesion failure times of 6,356 minutes when using a 1000 g. static load per square inch of bond area. The probe tack and 180° peel adhesion values are not affected when tapes are aged for 1 week at 50° C. Coated tapes made using 60 lb. Kromekote paper are aged in an oven at 70° C. for 4 weeks. These aged paper tapes show no evidence of bleed-through. Similarly good results are achieved using Wingtack 115 tackifying resin (Ring and Ball softening point =115°–120° C., molecular weight =1400 to 1500) instead of Wingtack 95.

The unmodified poly(52-propylene-co-48-1-hexene) has a probe tack value of 715 g./0.5 cm. diameter probe, a 180° peel adhesion value of 3.6 lb./in.-width, and a shear adhesion failure time of 3,112 minutes.

EXAMPLE 3

The procedure of Example 2 is repeated except that 47.5 g. of poly(52-propylene-co-48-1-hexene) having a melt viscosity of 20,000 cp. at 190° C. and 2.5 g. of Wingtack 95 tackifier are used to prepare the blend. This blend has a melt viscosity of 15,700 cp. at 190° C. and a Tg value of −27° C. Pressure-sensitive tapes made with this blend have a probe tack of 783 g./0.5 cm. diameter probe and a 180° peel adhesion value of 3.5 lb./in-width after aging tapes 24 hr. at 23° C. and 50% R.H. The tapes have a shear adhesion failure time of 3,644 minutes. The probe tack and peeladhesion values are not affected when tapes are aged for 1 week at 50° C. Similarly good results are obtained when 0.5 g. of Wingtack 95 tackifier is used in the blend.

EXAMPLE 4

The procedure of Example 2 is repeated except that 42.5 g. of poly(52-propylene-co-48-1-hexene) having a melt viscosity of 20,000 cp. at 190° C. and 7.5 g. of Wingtack 95 resin are used to prepare the blends. This blend has a melt viscosity of 11,250 cp. at 190° C. and a Tg value of −20° C. Pressure-sensitive tapes made with this blend have a probe tack value of 1042 g./0.5 cm. diameter probe, a 180° peel adhesion value of 4.0 pounds/inch width, and a shear adhesion failure time of 4,349 minutes. This blend also has good aging characteristics at 50° C.

Similarly good results are obtained when a copolymer having a melt viscosity of 11,000 cp. at 190° C. is used instead of the 20,000 cp. copolymer.

EXAMPLE 5

The procedure of Example 2 is repeated except 32.50 g. of poly(52-propylene-co-48-1-hexene) having a melt viscosity of 20,000 cp. at 190° C. and 17.50 g. of Wingtack 95 are used to prepare the blend. This blend has a melt viscosity of 5320 cp. at 190° C. and a Tg value of −13° C. The probe tack and 180° peel adhesion values of tapes made with this blend are 744 g./0.5 cm. diameter probe and 4.9 pound/inch width, respectively. The peel bonds have a tendency to zipper (quick release) when peeled. The shear adhesion failure time of the tapes is 6,707 minutes.

EXAMPLE 6

The procedure of Example 2 is repeated except 37.5 g. of poly(50-propylene-co-50-1-hexene) having a melt viscosity of 74,000 cp. at 190° C. and 12.5 g. of Wingtack 95 tackifier are blended to provide a compatible blend having a melt viscosity of 22,000 cp. at 190° C. This blend coats well on Mylar film and the coated tapes have a probe tack value of 1152 g./0.5 cm. diameter probe, a peel adhesion value of 4.3 pounds/inch, and a shear adhesion failure time of greater than 10,000 minutes.

EXAMPLE 7

The procedure of Example 2 is repeated except 37.5 g. of poly(52-propylene-co-48-1-hexene) having a melt viscosity of 20,000 cp. at 190° C. and 12.5 g. of Zonarez 7100 tackifying resin (a polyterpene type tackifying resin; Ring and Ball softening point=100° C.) [ASTM E28-67, Color 3 (Gardner 1963, 50% in Heptane) and Specific Gravity at 25° C. of 0.97 (ASTM D1963-61)]are used to prepare the blend. The blend has a melt viscosity of 7790 cp. at 190° C. and a Tg value of −19° C. Pressure-sensitive tapes made using this blend have a probe tack value of 1101 g./0.5 cm. diameter probe, a 180° peel adhesion value of 4.8 pounds/inch width, and a shear adhesion failure time of 4,646 minutes. Similarly good results are achieved when using Zonarez 7085 tackifying resin (Ring and Ball softening point=85° C.) instead of Zonarez 7100 tackifying resin.

EXAMPLE 8

The procedure of Example 2 is repeated except 37.5 g. of poly(52-propylene-co-48-1-hexene) having a melt viscosity of 20,000 cp. at 190° C. and 12.5 g. of Eastman Resin H-100 tackifying resin (a DAC-B hydrocarbon type tackifying resin; Ring and Ball softening point=100° C.) are used to prepare the blend. The blend has a melt viscosity of 8180 cp. at 190° C. and a Tg value of −16° C. When coated 0.001±0.0002 inch thick onto Mylar film, the blend produces coatings with a slight grainy appearance. Probe tack and 180° peel adhesion values of the tapes are 844 g./0.5 cm. diameter probe and 4.7 pounds/inch width, respectively. The shear adhesion failure time of this blend is 6,150 minutes.

EXAMPLE 9

The procedure of Example 2 is repeated except Nirez 1085 resin (a polyterpene type tackifying resin; Ring and Ball softening point=85° C.) is used instead of Wingtack 95 to prepare the blend. The blend has a melt viscosity of 7840 cp. at 190° C. This blend has pressure-sensitive properties similar to that described for the blend containing Wingtack 95. Similarly good results are obtained using Nirez 1135 resin (Ring and Ball softening point=135° C.) instead of Nirez 1085.

EXAMPLE 10

The procedure of Example 2 is repeated except that 37.5 g. of poly(40-propylene-co-60-1-hexene) having a melt viscosity of 25,000 cp. at 190° C. is blended with 12.5 g. of Wingtack 95 resin to provide a blend having a melt viscosity of 8400 cp. at 190° C. This blend is compatible and coated tapes have a probe tack value of 1000 g./0.5 cm. diameter probe, a peel adhesion value of 5.1 pounds/inch, and a shear adhesion failure time of 5,900 minutes.

Similarly good results are obtained with a poly(59-propylene-co-41-1-hexene) having a melt viscosity of 36,000 cp. at 190° C.

EXAMPLE 11

The procedure of Example 2 is repeated except that 37.5 g. of poly(46-1butene-co-54-1-hexene) having a melt viscosity of 30,000 cp. at 190° C. is blended with 12.5 g. of Wingtack 95 resin to provide a blend having a melt viscosity of 8550 cp. at 190° C. This blend is compatible and provides clear coatings on backing materials. Coated Mylar tapes have a probe tack value of 1150 g./0.5 cm. diameter probe, a peel adhesion value of 5.8 pounds/inch, and a shear adhesion failure time of 30 minutes. Tapes made using unmodified poly(46-1-butene-co-54-1-hexene) have a probe tack value of 720 g./0.5 cm. diameter probe, a peel adhesion value of 4.3 pounds/inch, and a shear adhesion failure time of 14 minutes.

EXAMPLE 12

The procedure of Example 2 is repeated except that 37.5 g. of poly(30-propylene-co-28-1-butene-co-42-1-hexene) having a melt viscosity of 41,000 cp. at 190° C. is blended with 12.5 g. of Wingtack 95 resin to provide a blend having a melt viscosity of 17,000 cp. at 190° C. This blend is compatible and provides clear coatings on Mylar film. Coated tapes have a probe tack value of 1290 g./0.5 cm. diameter probe, a peel adhesion value of 5.7 pounds/inch, and a shear adhesion failure time of 52 minutes. Tapes made using unmodified poly(30-propylene-co-28-1-butene-co-42-1-hexene) have a probe tack value of 750 g./0.5 cm. diameter probe, a peel adhesion value of 3.5 pounds/inch, and a shear adhesion failure time of 20 minutes.

Similarly good results are obtained with a poly (40-propylene-co-10-1-butene-co-25-1-octene) having a melt viscosity of 35,000 cp. at 190° C.

EXAMPLE 13

The procedure of Example 2 is repeated except that 37.5 g. of poly(50-propylene-co-50-1-octene) having a melt viscosity of 25,000 cp. at 190° C. is blended with 12.5 g. of Wingtack 95 resin to provide a compatible blend having a melt viscosity of 8300 cp. at 190° C. Coated Mylar tapes have a probe tack value of 1060 g./0.5 cm. diameter probe, a peel adhesion value of 4.9 pounds/inch, and a shear adhesion failure time of 6,425 minutes.

Similarly good results are obtained with a poly(50-propylene-co-25-1-octene-co-25-1-decene) having a melt viscosity of 55,000 cp. at 190° C.

EXAMPLE 14

The procedure of Example 2 is repeated except 25 g. of poly(52-propylene-co-48-1-hexene) having a melt viscosity of 20,000 cp. at 190° C. and 25 g. of Wingtack 95 are used to prepare the blend. The blend melt viscosity is 4550 cp. at 190° C. and the Tg value is −7° C. Coated tapes from this blend have a probe tack value of 100 g./0.5 cm. diameter probe. This example shows that a 50% concentration of the tackifier deleteriously affects the probe tack value of this 20,000 cp. copolymer.

The following examples (Examples 15 and 16) show that incompatible tackifiers are not operable in the practice of this invention. For example, the addition of incompatible tackifiers such as Foral 105 resin (a wood resin ester tackifier) and Picco 6100 (a polyindene-type tackifier) to the copolymers causes the coatings to be grainy and hazy and reduces the probe tack value of the blends to such a low level that they are no longer useful as pressure-sensitive adhesives.

EXAMPLE 15

The procedure of Example 2 is repeated except 37.5 g. of poly(52-propylene)-co-48-1hexene) having a melt viscosity of 20,000 cp. at 190° C. and 12.5 g. of Foral 105 tackifying resin ( a pentaerythritol ester of hydrogenated rosin; Ring and Ball softening point=105° C.) are used to prepare the blend. This blend has a melt viscosity of 8650 cp. at 190° C. The blend is incompatible and coatings on Mylar film are hazy. Photomicrographs of molten polymer samples of the blend also show this blend to be incompatible since some phase separation is evident. Coated tapes made with this blend have a probe tack value of only 206 g./0.5 cm. diameter probe. Because of the low probe tack value of this Foral 105 blend, it is not a useful pressure-sensitive adhesive.

EXAMPLE 16

The procedure of Example 2 is repeated except 37.5 g. of poly(52-propylene-co-48-1-hexene) having a melt viscosity of 20,000 cp. at 190° C. and 12.5 g. of Picco 6100 tackifying resin (a polyindene type tackifying resin; Ring and Ball softening point=100° C.) are used to prepare a blend having a melt viscosity of 10,200 cp. at 190° C. Photomicrographs of the melt of this blend show that Picco 6100 resin is highly incompatible with the propylene/1-hexene copolymer. Coated tapes are very grainy and hazy. The tapes have a probe tack value of only 249 g./0.5 cm. probe.

The following test methods are the ones used to evaluate the hotmelt, pressure-sensitive adhesives of this invention.

1. The melt viscosities of the adhesives are determined according to ASTM Procedure D1238.
2. The glass transition temperatures of the adhesives are determined using a differential scanning calorimeter (Perkin-Elmer DSC-2instrument) operating over the range of −70° C. to +200° C.
3. The ring and ball softening points of the tackifying resins are determined according to ASTM Procedure E28.
4. The probe tack values of the coated tapes are determined according to the method as described by Testing Machines, Inc., Amityville, New York, the manufacturer of the Polyken Probe Tack Tester (Model TM180-2). The probe tack values are determined at 23° C. with the Polyken Probe Tack Tester using a 0.5 cm. diameter probe, 100 g./cm² contact pressure, two-second contact time, and 2 cm./second separation speed.
5. The 180° peel adhesion values of the coated tapes are determined according to the Pressure Sensitive Tape Council's PSTC-1 test. The amount of adhesive residue left on the stainless steel testing panels when the bonds are tested is also noted.
6. The shear adhesion failure times of the coated tapes are determined according to the Pressure Sensitive Tape Council's PSTC-7 test.
7. The bleed-through (staining) resistance of the adhesives is determined by coating the adhesives from the melt (190° C.) 0.001 to 0.002 inch thick on 60 pounds Kromekote paper with a heated doctor blade. The coated paper tapes are then aged at 70° C. in a forced draft oven, and the degree of bleed-through on the paper backing is visually observed periodically up to four weeks.
8. The thermal stabilities of the adhesives are determined by heating the adhesives to 177° C. in the presence of air for 24 hours in a Brookfield Thermosel Viscometer. As a measure of thermal stability, the melt viscosities of the adhesives are determined with the viscometer at 177° C. after 1, 4, 8, 12, and 24 hours and differences from the initial melt viscosity are noted. Char and film formation are also noted.
9. The compatibilities of the various base polymers with the tackifying resins are determined by melting samples of each blend between glass microscope slides on a Mettler hot stage attachment for a microscope. The temperature of the melt is raised to about 150° C., photomicrographs are made, and phase separation (if any) is noted.

Although the invention has been described in considerable detail with particular reference to certain preferred embodiments thereof, variations and modifications can be effected within the spirit and scope of the invention.

We claim:

1. An adhesive composition capable of being used as a hot melt, pressure sensitive adhesive comprising a blend of
   (1) about 99 to 60 weight percent of at least one member selected from the group consisting of a propylene/higher 1-olefin copolymer, a 1-butene/higher 1-olefin copolymer, and a propylene/1-butene/higher 1-olefin copolymer, said copolymer containing 40 to 60 mole percent of at least one higher 1-olefin of 6 to 10 carbon atoms and having a melt viscosity of 10,000 to 75,000 centipoise at 190° C., and
   (2) 1 to 40 weight percent of at least one tackifying resin.

2. An adhesive composition according according to claim 1 wherein said tackifying resin is at least one hydrocarbon tackifying resin.

3. An adhesive composition capable of being used as a hot melt pressure sensitive adhesive comprising a blend of
   (1) 90 to 60 weight percent of a propylene/higher 1-olefin copolymer, a 1-butene/higher 1-olefin copolymer, and a propylene/1-butene/higher 1-olefin copolymer containing 40 to 60 mole percent of at least one higher 1-olefin of 6 to 10 carbon atoms and having a melt viscosity of 10,000 to 75,000 centipoise at 190° C., and (2) 10 to 40 weight percent of at least one tackifying resin selected from the group consisting of hydrocarbon resins, and polyterpene resins.

4. An adhesive composition according to claim 3 wherein said tackifying resin is a polyterpene resin.

5. An adhesive composition according to claim 3 wherein said tackifying resin is at least one hydrocarbon resin.

6. An adhesive composition according to claim 5 wherein said hydrocarbon tackifying resin has a Ring and Ball softening point of from about 80° C. to about 130° C., an acid number of from about 0–2, a saponification value of less than about 1, an iodine value of from about 30 to 100.

7. An adhesive composition according to claim 6 wherein said hydrocarbon tackifying resin is DAC-B hydrocarbon resin.

8. An adhesive composition according to claim 6 wherein said hydrocarbon tackifying resin is a resin sold under the trademark Wingtack 95 hydrocarbon resin, wherein said resin is a synthetic polyterpene hydrocarbon type tackifying resin based on a $C_5$ olefin fraction having a Ring and Ball softening point of 100°±5° C., an iodine number of 30, and a specific gravity of 0.93.

9. An adhesive composition according to claim 6 wherein said hydrocarbon tackifying resin is a resin sold under the trademark Wingtack 115 hydrocarbon resin having a Ring and Ball softening point of 115°–120° C. and a molecular weight of 1400 to 1500.

10. An adhesive composition according to claim 4 wherein said polyterpene tackifying resin is a resin sold under the trademark Zonarez 7100 terpene hydrocarbon resin, wherein said resin is a polyterpene type tackifying resin having a Ring and Ball softening point of 100° C. and a specific gravity at 25° C. of 0.97.

* * * * *